United States Patent [19]
Long

[11] 3,794,905
[45] Feb. 26, 1974

[54] BATTERY CHARGER CONTROL

[75] Inventor: Ronald E. Long, Redlands, Calif.

[73] Assignee: Lester Electrical of Nebraska, Inc., Lincoln, Nebr.

[22] Filed: Oct. 17, 1972

[21] Appl. No.: 298,344

[52] U.S. Cl............... 320/20, 320/37, 320/39
[51] Int. Cl............................. H02j 7/04
[58] Field of Search 320/20, 21, 37, 39, 40, DIG. 1, 320/22

[56] References Cited
UNITED STATES PATENTS

| | | | |
|---|---|---|---|
| 2,899,624 | 8/1959 | Marriott | 320/39 X |
| 3,424,969 | 1/1969 | Barry | 320/23 X |
| 3,624,481 | 11/1971 | Macharg | 320/39 |
| 3,700,997 | 10/1972 | Smith | 320/20 |

Primary Examiner—J. D. Miller
Assistant Examiner—Robert J. Hickey
Attorney, Agent, or Firm—Vincent L. Carney

[57] ABSTRACT

To control a regulated battery charger that is providing a regular charge to a battery, a comparator compares the potential of the battery with the potential from a digital-to-analog converter, and in response to this comparison: (1) activates a multivibrator when the potential of the battery is greater than the potential of the digital-to-analog converter, with the multivibrator pulsing a first counter that is connected to the digital-to-analog converter so that the count of the first counter and the potential of the digital-to-analog converter follow in discrete increments the increase in the potential of the battery as the battery is charged by the battery charger; and (2) provides reset pulses to the reset terminal of a second counter each time that the potential of the battery increases above the potential of the digital-to-analog converter, with the second counter causing the battery charger to be de-energized when it reaches a predetermined count between reset pulses.

19 Claims, 10 Drawing Figures

BATTERY CHARGER CONTROL

This invention relates to methods and apparatuses for controlling battery chargers.

One class of apparatus for controlling the operation of a battery charger includes a counter that follows the potential of the battery that is being charged, increasing its count as the potential of the battery increases, and a timer that provides control signals when the time between counts of the counter meets a certain predetermined criteria. A circuit for causing the counter to follow the potential of the battery includes an analog-to-digital converter that converts the count from the counter into an analog signal and a comparator that compares the signal of the digital-to-analog converter with the potential of the battery, adjusting the count of the counter in response to this comparison so that it follows the potential of the battery in incremental steps.

In a prior art type of this class of apparatus for controlling battery chargers, the counter is a stepping switch that steps from position to position. The timer sets a bistable switch when the counter remains in one position for a time longer than a first predetermined time, indicating that the battery potential is increasing more slowly than a first predetermined rate. If the stepping switch fails to remain in any one successive position for a second predetermined time after the bistable switch has been set, indicating that the battery potential is increasing faster than a second predetermined rate after having increased more slowly than the first predetermined rate, the charging potential applied to the battery is reduced to a very low value or to zero.

The prior art apparatuses of this type have several disadvantages.

Firstly, if the battery is not discharged to a sufficiently low battery potential at the start of a charging run, it begins charging with a high rate of change of potential and continues to a high battery potential until an over-voltage detector terminates the charging operation. The charging operation is not terminated by the battery charger control circuit when the rate of change of the battery potential exceeds the predetermined rate, because the bistable switch has not been set by sensing a low rate of change of the battery potential, and this switch must be set before the battery charger control circuit is able to terminate the charging operation upon the occurance of a high rate of change of the battery potential. If the battery is relatively old, the rate of change of potential of the battery during charging may become very low at a potential that is below the setting of the over-voltage protection circuit, thus causing the charging to continue until heat or excessive gassing damage the battery.

Secondly, the prior art control apparatuses for battery chargers lack sufficient precision to properly terminate a charging operation at the end of a charging run. For best results the charging operation should be terminated when the battery is fully charged. However, the potential of the battery changes very slowly when the battery is close to being fully charged, so slowly that a curve of charging current or battery potential plotted against time becomes asymptotic to the time axis in the region near the end of a charging operation. Unless the control apparatus is able to detect the rate of change of potential with precision, it may fail to terminate the charging operation for a long period of time in the asymptotic region of the charging run, thus over heating the battery. To avoid this problem, the prior art battery charger control apparatuses do not terminate the charging operation in the region of low rate of change of battery potential but instead terminate the operation when potential is changing more rapidly and the rate of change is therefore more easily detected.

Thirdly, the prior art control apparatuses for battery chargers utilize the same time period for measuring the rate of increase of the potential of a battery that is highly discharged as a battery which is only lightly discharged. However, a more rapid completion of a charging run can often be achieved by utilizing a shorter time period for batteries that are only lightly discharged than for batteries that are greatly discharged.

Fourthly, the prior art control apparatuses for battery chargers are bulky, expensive, and require substantial sources of power to operate.

Accordingly, it is an object of the invention to provide a novel apparatus and method for controlling a battery charger.

It is a further object of the invention to provide a novel battery charger control cirucit that is accurate and reliable.

It is a still further object of the invention to provide apparatuses and methods for terminating the charging of a battery when the rate of change of the charging current or the battery potential falls below a predetermined rate of change.

It is a still further object of the invention to provide apparatuses and methods for terminating the charging of a battery which are precise in terminating the operation near the end of a charging run where the current and potential increase asymptotically with time.

It is a still further object of the invention to provide a method and apparatus for controlling a battery charger which operates well regardless of the state of discharge of the battery at the start of the battery charging run.

It is a still futher object of the invention to provide a method and apparatus for controlling a battery charger that is able to automatically select and operate in a plurality of modes depending on the initial state of charge of the battery.

It is a still further object of this invention to provide an apparatus and a method for terminating the charge of a battery at the predetermined rate of change of charging the battery, which apparatus and method are sufficiently precise to terminate at the preset rate of change even though the line input potential of the input a.c. to the battery charger varies greatly at this time.

It is a still further object of the invention to provide a combination of a control circuit for a battery charger and a battery charger in which the regulation increases near the end of a charging run to improve the operation of charging the battery.

In accordance with the above and further objects of the invention, there is provided an apparatus for controlling a battery charger having a digital potential-measuring circuit, a low-rate-of-change detector, a charge-level logic circuit and a battery-charger switching unit, with the digital potential measuring circuit including circuitry to provide signals to the low-rate-of-change detector and the change level logic circuit, which signals indicate an increase in the potential of the battery as the battery is charged.

When the rate of change of the potential of the battery falls below a predetermined rate, the low-rate-of-change detector signals the battery-charger switching unit to de-energize the battery charger. The charge-level logic circuit performs several functions, such as: (1) selecting one of two time periods in which the battery potential must increase by one increment or the battery charger is de-energized, with the selection being based on the charged condition of the battery at the start of a battery run; (2) causing information to be stored in the event of a relatively long period of time in which the line power is disconnected; and (3) in response to signals from the digital potential measuring circuit, signaling the battery charger switching unit to cause it to perform certain functions, such as de-energize the battery charger when the potential of the battery exceeds a predetermined high potential and energize the battery charger when the battery is stored and its potential falls below a certain level.

The digital potential-measuring circuit includes an MOS counter controlled by a circuit that causes the count to represent the potential of the battery. The circuit that controls the MOS counter includes a digital-to-analog converter that converts the count from the MOS counter to an analog potential, a comparator that compares the potential of the battery with the output potential of the digital-to-analog converter and a multivibrator that pulses the input terminal of the counter when the comparator indicates that the potential of the battery is higher than the potential of the output of the digital-to-analog converter so that the counter follows changes in the potential of the battery and the digital-to-analog converter establishes a series of successively higher reference levels to be compared with the potential of the battery. The comparator also provides pulses to the low-rate-of-change detector each time that the battery potential exceeds a reference level established by the digital-to-analog converter.

The output terminals of the MOS counter are used by the charge level logic circuit to perform three special functions, which are: (1) to select a time period for measuring the rate of change of potential, which time period is short for lightly discharged batteries and longer for heavily discharged batteries; (2) to provide over-voltage protection; and (3) to delay operation of low-rate-of-change detector until predetermined battery potential is reached so as to avoid premature shut down.

To provide over-voltage protection, an output of the counter that is energized when the battery potential is at a high amplitude is connected to cause the battery charger switching unit to de-energize the battery charger when the output is energized.

To select a short or a long time period in which to measure the rate of change of battery potential, the charge level logic circuit determines at the start of a charging run if the battery is charged or is discharged. As the MOS counter counts upwardly from the start of a battery charging run, its count proceeds periodically under the control of the multivibrator. The charge-level logic circuit is connected to one output of the counter and to the output of the comparator, and with these two connections, selects the time base of the timer. If the battery being charged is only lightly charged at the start of the charging run, the terminal of the counter connected to the charge-level logic circuit is energized within about 20 seconds by the counting of the counter under the control of the multivibrator. If this terminal is activated before a signal is provided from the comparator indicating that the battery potential has been increased through a reference level established by the digital-to-analog converter, a short time period is selected and, if the signal from the comparator indicates that a reference level is exceeded before the connection to the MOS counter is reached, a longer time period is selected.

To provide winter storage maintenance, the charge level logic circuit energizes the battery charger when the potential of the battery falls below a predetermined level during winter storage of the battery.

The timer is a MOS binary ripple counter having a large number of stages to provide precision in measuring the time period required for the battery to increase in potential from one reference level to the other. One output from the counter is utilized to provide a short time base for charging batteries that are only lightly discharged and another output from the final stage of the counter is utilized to establish a longer time base for charging batteries that are heavily discharged. Since the signal from the final stage is not unique to only one value in binary ripple counters, a digital detector determines when the output signal at the last stage represents the final value and applies a signal only at that time to the battery charger switching unit to de-energize the battery charger.

The battery charger includes a regulator that provides an increasing degree of precision as the potential of the battery increases thus utilizing the multiple stages of the MOS ripple counter to the fullest advantage near the asymptotic region at the end of the charging run.

The battery charger switching unit receives signals indicating that the battery run should be terminated and energizes a low power relay in response to the signals. The low power relay controls a heavier power relay which energizes or de-energizes the battery charger.

From the above description, it can be understood that the apparatus and method for controlling a battery charger has several advantages.

Firstly, the battery charger control circuit energizes the battery charger when the rate of change of the potential or current is very low. This is the optimum time for terminating the battery charging run and automatically compensates for differences in the maximum potential which differences occur from one battery to another and with the age and temperature of the battery.

Secondly, the termination of the battery charging run is accomplished with great precision. This precision is provided by a combination of factors, one of which is the use of a multiple stage MOS counter as the timer. By using this counter in conjunction with other semiconductor circuitry a large number, such as 1024 reference levels may be established. With a voltage regulator in the battery charger which increases in precision as the potential of the battery increases, the large number of reference levels near the critical end portion of the charging run provides a precise indication of the rate of change of the battery potential. This precise indication controls the turn off time with great precision.

Thirdly, the entire unit is compact and economical because it utilizes semiconductor circuitry to perform its operations. The battery charger switching unit includes relatively inexpensive transistors because the control relay is controlled at low power and controls a higher power relay for energizing and de-energizing the battery charger.

Fourthly, under some circumstances, the time required for a charging run is greatly reduced. This is possible because the battery charger control circuit is capable of operating in two modes, a first mode for a heavily discharged battery and a second mode for a lightly discharged battery. A relatively short time base for measuring the changes in the potential of the battery is utilized in the mode of operation selected for the lightly discharged battery. The control apparatus automatically selects the mode in accordance with the initial state of the battery at the beginning of the charging run.

Fifthly, other types of operations such as overvoltage protection and winter storage maintenance are provided economically from the same circuitry utilized for the primary function of terminating a battery charging run during the period of time in which the rate of change of potential is low.

Sixthly, the operation of the timer is improved by a digital detector having special advantages. The digital detector detects the maximum output value from the counter, without decoding the output from more than one terminal of the counter. At the same time, it suppresses any tendency of the controlled circuit and the controlling circuit to oscillate.

The above noted and other features of the invention will be more fully understood from the following detailed description when considered with reference to accompanying drawings in which.

SYSTEM STRUCTURE AND OPERATION

Figure 1:
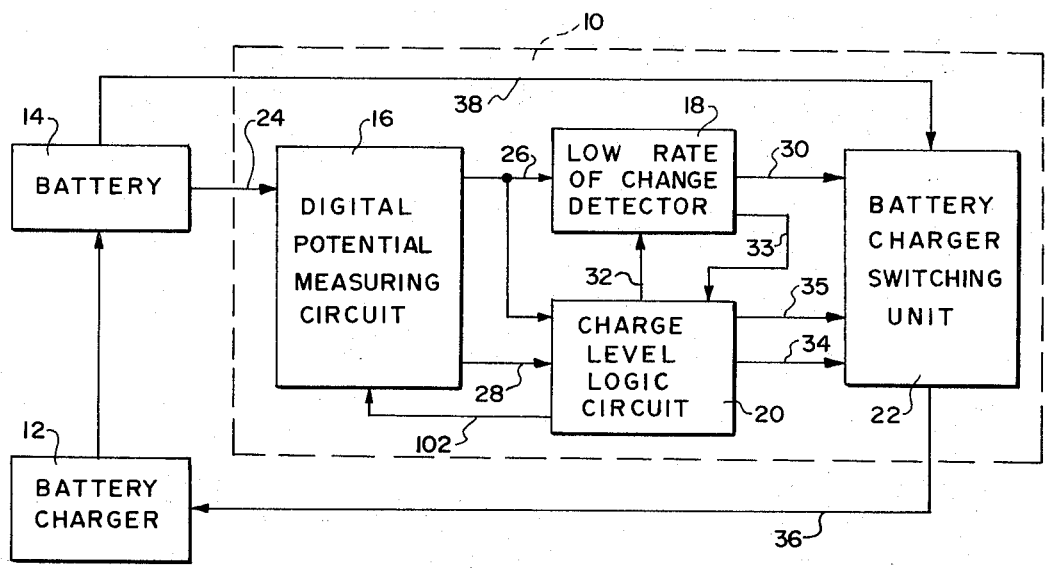
FIG. 1 is a block diagram of a battery charger control circuit in accordance with an embodiment of the invention.

In FIG. 1, there is shown a battery-charger control circuit 10, a battery charger 12 and a battery 14, each being electrically connected to the others. The battery charger control circuit 10 includes circuitry that senses the electrical potential of the battery 14, and in accordance with this sensed potential, de-energizes the battery charger 12 when the battery 14 is fully charged.

In the preferred embodiment, the battery charger 12 is a battery charger of the type used to charge battery-powered vehicles such as golf carts and the like. However, the novel battery-charger control circuit 10 may be used to control any type of battery charger that rectifies alternating current to provide direct current electrical power appropriate for charging batteries, although certain obvious changes may be required in the circuitry to adapt it to different special types of battery chargers.

In the preferred embodiment, the battery charger 12 is a type of battery charger that has special characteristics which cooperate in a novel manner with the battery-charger trol circuit 10, and for this purpose includes a voltage regulator which has sufficient regulation at least at the potentials occurring in a battery that is fully charged or close to being fully charged so that the variations in potential applied at times to the battery through the voltage regulator as a result of line voltage variations are not so great as to cause a negative excursion near the finishing portion of the charging run for the battery.

Negative excursions of the battery potential when the potential is near the fully charged potential can prevent the proper selection of the time for terminating a charging run. In selecting the time for de-energizing the battery charger 12, the battery-charger control circuit 10 measures the rate of change of voltage with respect to time. When the battery is fully charged or close to being fully charged a characteristic curve of battery potential against time for the battery charging run is nearly asymptotic to the time axis so that excursions of the potential cause a relatively large change in the sensed rate of change of the potential with respect to time in this portion of the charging run. Negative excursions, if occurring at the end of a particular timing interval, cause a premature de-energization of the battery charger 12.

The degree of regulation of the voltage regulator determines the likelihood of a premature shut down upon the occurrence of a negative excursion. For example, if the regulation of the battery charger 12 allows heavy negative excursions, the battery-charger control circuit 10 may de-energize the battery charger 12 as much as 3 hours before the optimum time for such de-energization.

One manner of achieving sufficient regulation with economy in construction, is to utilize a transformer within the battery charger 12, which transformer includes a saturable reactor that limits the amount of power that can be applied as d.c. power to the output of the battery charger to a fixed amount. However, other types of voltage regulators may be used to achieve the necessary regulation.

To control the battery charger 12, the battery-charger control circuit 10 includes a digital-potential-measuring circuit 16, a low-rate-of-change detector 18, a charge-level logic circuit 20 and a battery-charger switching unit 22. The digital potential-measuring circuit 16 includes circuitry electrically connectable to the battery 14 to measure the potential of the battery 14 and to supply digital information concerning changes in the potential level of the battery as it charges to the low-rate-of-change detector 18 and to the charge-level logic circuit 20, with both the low-rate-of-change detector 18 and the charge-level logic circuit 20 being electrically connected to the battery charger switching unit 22 to provide signals thereto under different circumstances which indicate that the battery is fully charged. In response to these signals the battery charger switching unit 22 prevents the battery charger 12 from applying further substantial charge to the battery 14.

In the preferred embodiment, the battery charger 12 is electrically de-energized by the signal from the battery charger switching unit 22 to prevent any further charge from being applied to the battery 14 by the battery charger 12 once the battery 14 is fully charged. However, in other embodiments, a trickle current is applied thereafter.

To measure the potential of the battery 14, the digital potential-measuring circuit 16 includes a circuit that receives the potential of the battery 14 through a conductor 24 and applies a signals to the low-rate-of-change detector 18 through a conductor 26 each time that the potential of the battery 14 increases above any one of a series of potential reference levels and to the charge-level logic circuit 20 through a group of conductors indicated by the single line 28 in FIG. 1 when the potential of the battery 14 reaches each of certain amplitudes.

To detect a rate of change of potential of the battery 14 that is so low as to indicate that the battery is fully charged, the low-rate-of-change detector 18 includes circuitry that receives signals from the conductor 26 and applies a signal to the battery charger switching unit 22 through a conductor 30 whenever a predetermined period of time elapses after one signal and before a succeeding signal is applied to the low-rate-of-change detector 18. Since two successive signals are applied to conductor 26 only when the potential of the battery 14 increases by at least one increment of potential between one potential reference level and the next potential reference level, the repetition rate of the signals on conductor 26 increases as the rate of change of the battery potential increases and when the time between two successive signals exceeds a predetermined period, the potential of the battery is changing at a rate sufficiently low to indicate that the battery is fully charged.

The charge-level logic circuit 20 includes circuitry that receives signals on any of several different conductors from the digital potential measuring circuit 16 and in response to these signals and to internally generated logic applies output signals to either the low-rate-of-change detector 18 through the conductor 32 or to the battery charger switching unit 22 through the conductors 34 and 35 to perform any of several functions such as:

1. de-energize the battery charger 12 if the potential of the battery 14 rises above a maximum potential;
2. select the time base for detecting a low-rate-of-change of potential;
3. provide stand-by protection for long periods of power shut down time;
4. during long periods of storage of the battery, energizing the battery charger 12 whenever the potential of the battery 14 falls below a predetermined potential; and 5. decode the output of the low-rate-of-change detector 18 at certain times when the output is in a coded form not suitable for use with the circuitry to which it is being transmitted.

To energize and de-energize the battery charger 12, the battery charger switching unit 22 includes switches that are controlled in response to signals received over conductors 30, 34, and 35, the control over the battery charger being indicated by the line 36 connecting the battery charger 12 and the battery charger switching unit 22. The battery charger switching unit 22 also receives the potential of the battery 14 through conductor 38, which potential serves as a reference and a source of power for certain switching operations within the battery charger switching unit 22.

While in the preferred embodiment the battery-charger control circuit 10 senses the potential of the battery 14 and controls the battery charger 12 in accordance with the sensed potential, it is also possible to construct a battery-charger control circuit that operates in accordance with the principle of this invention but senses the charging current instead of the potential of the battery 14. The changes necessary in the preferred embodiment to enable the battery-charger control circuit 10 to operate by sensing the charging current rather than the potential of the battery 14 are known to persons skilled in the art so that a person skilled in the art would be able to make such changes from the description provided herein.

In the preferred embodiment, the battery 14 is a 36 volt, lead-acid battery of the type that supplies power to electrically operated vehicles such as golf carts and the like. However, the battery-charger control circuit 10 and battery charger 12 may also charge other types of batteries such as nickle-cadmium batteries, nickle-iron batteries and the like. Moreover, with proper adjustments, they can charge batteries having other rated potentials such as 18 volts, 24 volts, 72 volts or the like and also batteries used for other purposes.

In the operation of the battery charger 12 and the battery-charger control circuit 10, the battery 14 is charged at a rate which is as close to the optimum rate of charging as possible. The optimum rate differs from battery to battery, but in a typical lead-acid, 36 volt battery, the optimum rate is approximately 25 amperes. This is a regular rate of charge and is substantially below what is known in the art as a fast charge.

The manner in which the battery-charger control circuit 10 controls the battery charger depends partly on whether the battery is discharged or charged at the time operation is initiated.

Figure 2:
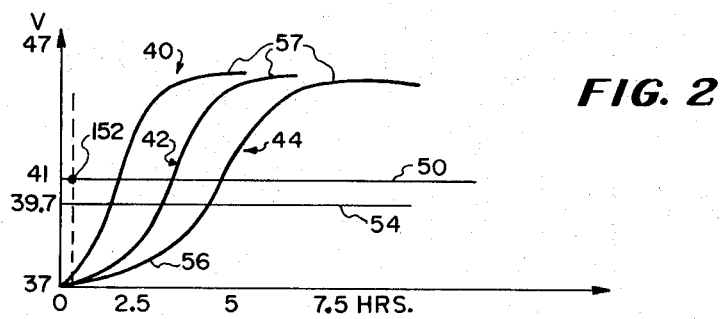
FIG. 2 is a graph having abscissae of time and ordinates of battery potential and including curves representing charging runs for heavily discharged batteries in accordance with an embodiment of the invention.
Figure 3:
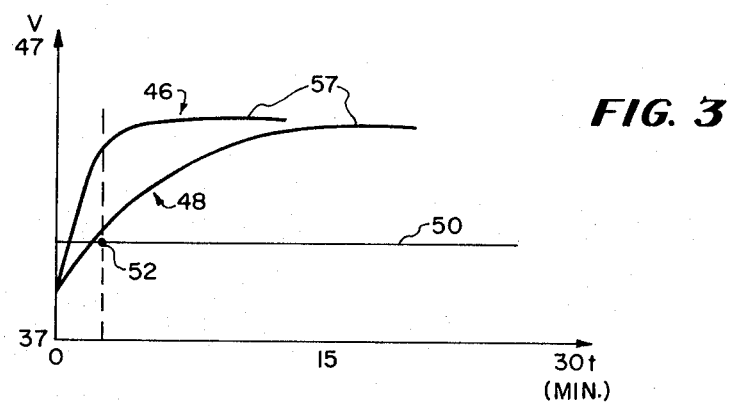
FIG. 3 is a graph having abscissae of time and ordinates of battery potential and including curves of battery charging runs for lightly discharged batteries in accordance with an embodiment of the invention.

In FIGS. 2 and 3, there are shown two graphs having ordinates of voltage and abscissae of time, with the graph shown in FIG. 2 having three curves 40, 42, and 44 representing typical charging runs for a discharged battery and with the graph shown in FIG. 3 having two curves 46 and 48 representing typical charging runs for a charged battery. A discharged battery is a battery that has had a substantial amount of power removed from it such as the battery which has powered an electrically driven vehicle for more than 3 minutes and typically may be a battery which has powered such a vehicle for 2 or 3 hours. On the other hand, a charged battery includes batteries which have not had any substantial amount of power removed from them but may include batteries in which some power has been removed by a standby control circuit or by light running of an electrically driven vehicle for short periods of time such as two or three minutes or less.

In FIG. 2, the curve 40 represents a charging run of a battery that has been lightly discharged such as a battery that has powered an electric lift truck for approximately 30 minutes; the curve 44 represents a charging run for a battery that is heavily discharged such as one that has powered an electrical lift truck for 8 hours; and the curve 42 represents the charging run for a battery with a medium discharge such as one that has powered an electrical lift truck for approximately 4 hours.

In FIG. 3, the curve 46 represents a charging run for a fully charged battery which was left standing for approximately 5 minutes after being charged and the curve 48 represents the charging run for a fully charged battery which was left standing for approximately 1 day after being fully charged. In either situation no substantial amount of power has been removed from the batteries.

The curves 40–48 are shown as examples in explaining the operation of the battery-charger control circuit 10 and the battery charger 12 and will be referred to hereinafter during this explanation. However, actual battery characteristics differ from battery to battery and from starting charge condition to starting charge condition. Accordingly, the battery charger 12 and battery-charger control circuit 10 may be used with batteries having different characteristics than those shown.

Upon initiating a charging operation, such as by inserting the plug from the battery charger into the receptical provided in the battery unit for the purpose, power is applied to the battery-charger control circuit 10 from the battery 14 which in turn energizes the battery charger 12. At this time the battery-charger control circuit 10 selects the mode of operation of the low-rate-of-change detector 18

To select a mode of operation of the low-rate-of-change detector 18, the charge-level logic circuit 20 determines if the potential of the battery rises to a preselected potential, which in the preferred embodiment is 41 volts, illustrated by the line 50 in FIGS. 2 and 3, within a fixed period of time. If it rises to the preselected potential before the expriation of that fixed period of time, the charge-level logic circuit 20 opens a gate connecting conductors 32 and 33, which causes the low-rate-of-change detector 18 to operate in the discharged-battery mode.

If the battery is in the discharged condition as illustrated by the curves for typical battery charging runs shown in FIG. 2, the potential of the battery fails to arrive at point 52 on curve 50 within an approximately 20 second period but reaches the curve 50 at some later time. Since it does not cross the curve 50 within approximately 20 seconds, the discharge-mode is selected before the potential reaches the level illustrated by the curve 50.

Before the battery potential reaches the curve 50, it reaches a lower potential shown by the curve 54 in FIG. 2, which potential is 39.7 volts in the preferred embodiment. At this potential, the low-rate-of-change detector 18 begins to detect the rate of change of the potential of the battery. At this time, the potential of the battery has already passed an initial low-rate of change portion of the charging run indicated as an example on the curve 44 at 56 and is operating in a region which has a high rate of change. Later, when the battery is almost fully charged, the battery potential reaches a region of operation having a low rate of change such as the region 57. When the rate of change falls below the predetermined minimum of rate of change in this region, the low-rate-of-change detector 18 applies a signal to the battery charger-switching unit 22 through the conductor 30, causing the battery charger switching unit 22 to de-energize the battery charger 12.

If the battery 14 is in its charged condition at the start of the operation, the battery potential increases above the potential which is shown by the curve 50 (FIG. 3) in less than the time indicated at 52 and reaches this potential without passing through any preliminary low rate of change of the potential. Shortly after the potential of the battery increases above the curve 50, the low-rate-of-change detector 18 begins to detect the rate of change of potential. When the rate of change of potential falls to a predetermined low value, such as occurs in the region 57 on the curve 46, the low-rate-of-change detector 18 applies a signal to the battery charger switching unit 22 through the conductor 33, the charge level logic circuit 20 and the conductor 34, causing the battery charger switching unit 22 to de-energize the battery charger 12.

To detect a low-rate-of-charging condition, the digital potential measuring circuit 16 provides a signal to the low-rate-of-change detector 18 each time the potential of the battery 14 increases by 0.012 volts when operated above 38 volts. If the time between receiving two successive signals exceeds a predetermined period of time, the low-rate-of-change detector 18 causes the battery charger switching unit 22 to de-energize the battery charger 12. The predetermined period of time is selected so that the battery charger 12 is de-energized when the potential of the battery is increasing slowly such as occurs in region 57. This time is selected to be shorter when the battery is operating in the charged mode than when it is operating in the discharged mode to enable more rapid shut down when the battery is charged at the start of the charging run.

DIGITAL POTENTIAL MEASURING CIRCUIT

Figure 4:
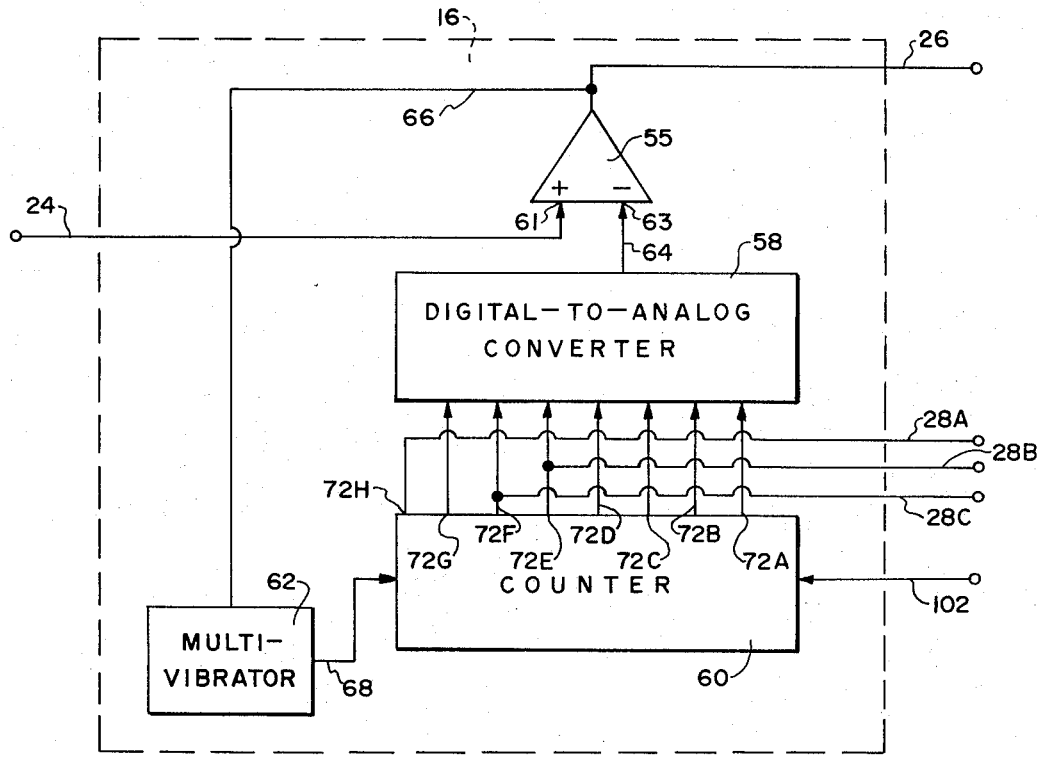
FIG. 4 is a block diagram of a digital potential measuring circuit useful in the embodiment of battery charger control circuit shown in FIG. 1.

In FIG. 4, there is shown a block diagram of the digital potantial measuring circuit 16 having an operational amplifier 55 serving as a comparator, a digital-to-analog converter 58, a counter 60 and a d.c. controlled astable multivibrator 62.

To generate reset pulses each time the potential of the battery increases above a preset potential reference level, the operational amplifier 55 has one of its input terminals 61 electrically connected to the conductor 24 to receive the potential of the battery 14 and the other of its input terminals 63 electrically connected to the output of the digital-to-analog converter 58 through a conductor 64 to receive a reference potential.

The potential reference levels are discrete amplitudes of potential, spaced apart from each other by a predetermined increment of potential. The potential reference level at any one time is the last battery potential of one of these spaced-apart increments. In the preferred embodiment a voltage increment of 0.012 volts is selected so that the distance from one potential reference level to the other is always 0.012 volts. With a potential increment of 0.012 volts, there are approximately 1024 potential reference levels in a typical battery charging run in the preferred embodiment. However, for other types of batteries, other applications, and other conditions of charging the batteries there may be more or fewer potential reference levels.

In the preferred embodiment, the special advantage is taken of relatively small increments of potential between successive potential reference levels. By selecting relatively small increments of potential, the precision of the operation of charging a battery is substantially increased.

The precision of operation is increased even though line voltage variations cause some excursions in the output potential of the battery charger that extend through more than one potential reference level. In the preferred embodiment, the voltage variations in the output of the battery charger 12 occur at lower battery potentials. As the battery becomes more fully charged and its potential rises, the regulation of the voltage regulator used in the preferred embodiment improves so that the voltage variations applied to the battery and to the battery charger control circuit 10 become smaller.

At the lower battery potentials, voltage excursions extending from reference level to reference level do not materially affect the operation of the battery charger control circuit although they would affect the operation of this circuit at higher potentials, at which potentials they could cause a premature shut down of the battery charger. However, the voltage excursions do not occur at the relatively high potentials, and at these potentials, the relatively small increments of potential enable the battery charger to operate more effectively in the region where the curves for battery runs are asymptotic to the time axis. Accordingly, it has been found that there are fewer problems associated with the use of a relatively small potential increments and these problems are outweighed by the increased precision obtained when operating close to a fully charged condition.

To provide the reference levels, the counter 60 includes a plurality of output terminals, terminals 72A–72H being shown in FIG. 4 as examples, with each output terminal being electrically connected to a different input of the digital-to-analog converter 58 so that the count of the counter 60 causes the digital-to-analog converter 58 to apply a potential level to the input 63 of the comparator 55, which potential level is equivalent to the count of the counter 60. The count on the counter 60 is increased whenever the battery potential on conductor 24 rises above the last reference level applied to conductor 64, resulting in the energization of the multivibrator 62 through the conductor 66. Under these circumstances, the multivibrator 62 generates pulses that are applied to the counter 60 through the conductor 68, causing the count on the counter 60 to increase. When the count of the counter 60 increases, new reference levels are obtained at the output of the digital-to-analog converter 58 until the potential at input 63 equals or is greater than the potential at input 61, in which case the output of the comparator 55 is zero, thus stopping the multivibrator 62.

The output terminals 72A–72H of the counter 60 provide indications of the next higher reference level from the level through which the battery potential has passed during the charging run. These outputs therefore give an indication of battery charging potential that may be used for many purposes, some of which are to control internal logic within the battery charger and control apparatus 10. For example, there are three logic functions in which the signals play a part, which are: (1) to provide for over-voltage protection; (2) to select the mode of operation of the battery charger by distinguishing between a charged battery and a discharged battery; and (3) to start the timing multivibrator that operates the timer within the low-rate-of-change detector 18.

Firstly, to provide over-voltage protection, connection is made to the counter output terminal 72H which is energized only when the battery potential is extremely high. This connection is provided through the conductor 28A to provide an over-voltage protection signal which de-energizes the battery charger 12 if the low-rate-of-change detector fails to detect the fully charged potential and the potential of the battery rises to an undesirable amplitude.

Secondly, to provide logic signals to select the mode of operation of the battery charger at the start of a charging run by distinguishing between a discharged battery and a charged battery, the reset signal on conductor 26 from the comparator 55 cooperates with a signal on conductor 28C from the output terminal 72F of counter 60. The selection of the mode is made in response to these two signals within the charge level logic circuit 20, which determines if the battery is charged or discharged from the time sequence of an output from the comparator 55 and an output at the output terminal 72F of the counter 60. Since the counter 60 is continuously counting in response to clock pulses as long as the battery potential remains above the last reference potential level, the output terminal 72F is energized within about 20 seconds of the start of a charging run on a charged battery so that, if the battery potential is above the potential reference level corresponding to output terminal 72F, resulting in an output signal on conductor 28C before a signal appears on conductor 26, then a charged-mode of operation is selected in about 20 seconds from the start of a charging run and, if it is not above potential reference level corresponding to the output at terminal 72F, resulting in an output pulse on conductor 26 before a signal appears on conductor 28C, a discharge-mode of operation is selected.

Thirdly, the output signal from terminal 72E, which is energized at a potential above the potential at which the rate of change of potential is above a predetermined rate, starts the timing multivibrator that operates a timing counter within the low-rate-of-change detector 18.

The counter 60 and the multivibrator 62 may be any of several conventional types of counters and multivibrators, but it has been found that MOS counters and multivibrators are especially well suited for use in this circuit. The counter 60 is a binary coded ripple counter that applies static positive potentials to the terminals 72A–72H, 72A being the lowest order output and 72H the highest, in response to pulses applied to the counter 60 through the conductor 68.

To apply a potential to the positive input of the operational amplifier 55 that corresponds to the last reference level established by the counter 60, the digital-to-analog converter 58 includes a plurality of input terminals, each electrically connected to a different one of the output terminals of the counter 60. The digital-to-analog converter 58 converts the digital signal received from the counter 60 into a corresponding potential level and applies this potential level to the negative input terminal of the operational amplifier 55 through the conductor 64. In the preferred embodiment, the digital-to-analog converter 58 is a resistor ladder type of converter but other types are, of course, usable with the proper changes.

In the operation of the digital potential measuring circuit 16, the battery potential is applied to the conductor 24, causing the counter 60 to count upwardly to a value equalling the potential of the battery and to follow the potential of the battery in increments step by step as it increases, with an output signal being applied to the output conductor 26 each time that the potential of the battery increases above the last potential reference level established by the counter 60.

To cause the counter 60 to count to the reference lvel just above the starting potential of the battery, the battery potential is applied to the noninverting terminal 61 of the operational amplifier 55 where it is compared to the output potential from the digital-to-analog converter 58 which output potential is applied to the inverting terminal 63 through the conductor 64. At the start of the charging operation, the digital-to-analog converter 58 provides a low starting potential so that the comparator 55 provides a positive output signal to the multivibrator 62 through the conductor 66 causing the multivibrator 62 to generate a series of clock pulses and apply them to the input terminal of the counter 60 through the conductor 68. The clock pulses applied through the conductor 68 cause the counter 60 to count upwardly.

As the counter 60 counts upwardly, the output terminal 72E is energized, applying a potential to the conductor 28B which energizes the timer within the low-rate-of-change detector 18 through a timer control circuit to be described hereinafter, which timer control circuit is located within the charge-level logic circuit 20.

At a still higher battery potential, the terminal 72F is energized to apply a potential to the conductor 28C.

If the potential of the battery is above the potential that activates the output terminal 72F of the counter 60 at the time that the charging operation is started, the terminal provides an output pulse to the conductor 28C about twenty seconds after the initiation of the charging run. Up to this time a positive voltage has been continually applied from the comparator 55 to the conductor 66 so that the output pulse on conductor 28C occurs before a zero potential on conductor 26. The time sequence of the signals on conductors 28C and 26 causes a time-base selector within the charge-level logic circuit 20 (FIG. 1) to select the charged mode of operation.

If the potential of the battery at the time the charging run is started is below the potential represented by the terminal 72F of the counter 60, the output potential from the operational amplifier 55 decreases to a zero potential before the counter 60 applies a pulse to the output terminal 72F. The time-base selector within the charge level logic circuit 20 receives these two pulses and, in accordance with their sequence, selects the discharged mode of operation for the battery charger.

To supply an analog potential to the inverting terminal 63 of the operational amplifier 55, the digital-to-analog converter 58 receives the digital count from the counter 60 and converts it to an equivalent analog value. In this manner the operational amplifier 55 continually compares the potential of the battery applied to it through the conductor 24 with the analog potential representing the last reference level established by the counter 60, which analog potential is applied to it through the conductor 64.

LOW-RATE-OF-CHANGE DETECTOR

Figure 5:
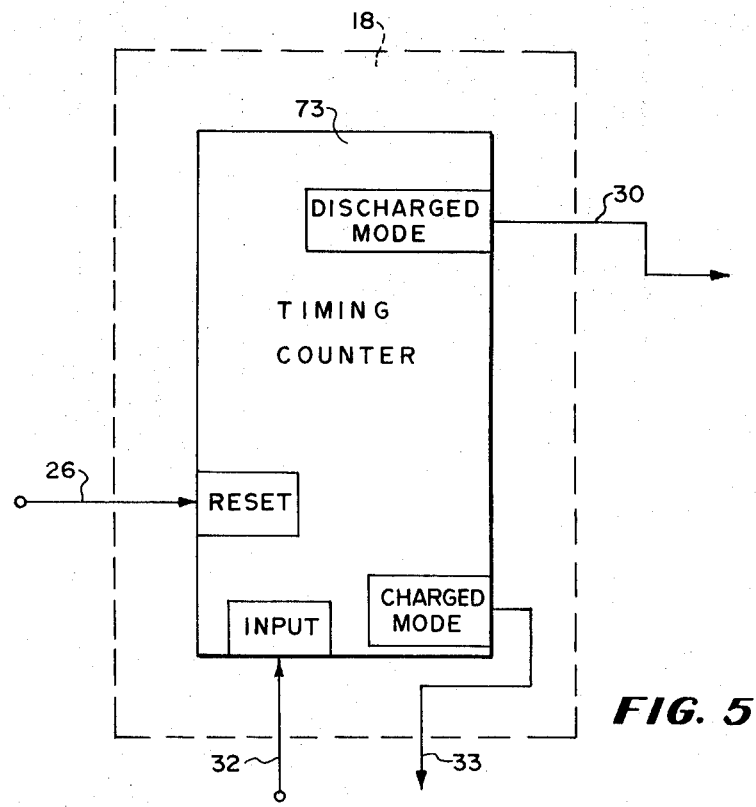
FIG. 5 is a block diagram of a low-rate-of-change detector useful in the battery charger control circuit of FIG.1.

In FIG. 5, there is shown a block diagram of the low-rate-of-change detector 18 comprising a timing counter 73 having a reset terminal electrically connected to the digital potential-measuring circuit 16 (FIG. 1) through the conductor 26, a pulse input terminal electrically connected to the charge-level logic circuit 20 (FIG. 1) through the conductor 32, a charged-mode output terminal electrically connected to the charge-level logic circuit 20 through the conductor 33, and a discharged-mode output terminal electrically connected to the battery charger switching unit 22 through a conductor 30.

In the preferred embodiment, the timing counter 73 is a MOS counter having 12 stages. When the timing counter 73 is counting, 1.72 Hz. pulses are applied to its count input terminal through the conductor 32 from the charge-level logic circuit 20 (FIG. 1), causing it, unless reset by a positive going pulse on conductor 26 from the digital potential-measuring circuit 16, to provide an output pulse to its charged mode output terminal and to conductor 33 within 5 minutes after starting a count and to provide a pulse to its discharged-mode output terminal and to conductor 30 40 minutes after starting a count. With this mechanization, the counter 73 measures the time between reset pulses and the time required for the battery potential to increase one potential reference level.

While a complementary MOS counter is used in the preferred embodiment, other kinds of counters may be used as well. Moreover, there are other types of timing devices which are usable and which are not counters. However, the counter 73 provides good precision in measurement and is superior to most other types of timing devices for use in the preferred embodiment. Moreover, it enables one or more different time intervals to be selected so that different stages of charge of a battery may be accommodated by simple switching networks such as those found in the charge-level logic circuit 20. For example, the charged battery mode uses the output terminal of the counter 73 that is connected to conductor 33. This output terminal is energized at a count of 512. On the other hand, to establish a time-base for a discharged battery, the highest order output terminal of the counter 73 is electrically connected to conductor 30 and is energized at a count of 4096.

As mentioned above, the precision with which the battery charger control circuit 10 is able to de-energize the battery charger 12 is enhanced by using potential reference levels separated by very low voltage increments such as 0.012 volts. One reason that such small increments of potential may be used between reference levels is that the timing counter 73 has a large number of stages so that it can indicate very short periods of time. The periods of time must be very short to be able to measure the time between small changes such as 0.012 volts.

In the operation of the low-rate-of-change detector 18, the timing counter 73 is in its reset condition at the beginning of a battery charging run. At this time, no counting pulses are applied to the input of the timing counter 73 through the conductor 32. This avoids having the timing counter 73 begin counting while the potential applied to the digital potential-measuring circuit 16 (FIG. 1) from the battery is rising with a low rate of change of potential at the very beginning of the charging run, thereby avoiding an early termination of the charging run.

When the potential of the battery passes through a predetermined potential reference level, which is 39.7 volts in the preferred embodiment, the counter 60 energizes the output terminal 72E which applies an output potential to the timer control circuit within the charge-level logic circuit 20. The charge-level logic circuit in turn applies 1.72 Hz pulses to the input of the counter 73 through the conductor 32, causing it to count upwardly. Each time the battery potential exceeds a potential reference level established by the counter 60 by a predetermined amount, a positive reset pulse is applied to the reset terminal of the timing counter 73 through the conductor 26, resetting the timing counter.

When 5 minutes elapses from a reset pulse applied to the timing counter 73, an output signal is applied to the charge-mode output terminal connected to the conductor 33 from a stage that is energized at a count of 512. This pulse is applied to the charge-level logic circuit 20, and if the battery-charger control circuit 10 is operating in the charged mode, this pulse is gated to the battery charge switching unit 22 to de-energize the battery charger 12, the pulse being blocked if the battery-charger control circuit is operating in the discharged mode.

If the battery charger control circuit is operating in the battery discharged mode, the counter 73 applies a signal to the discharged mode output terminal connected to conductor 30 forty minutes after the last reset pulse which is when a count of 4096 is reached. This signal is applied to the battery charger switching unit 22 through a decoder to be hereinafter described to de-energize the battery charger 12.

CHARGE-LEVEL LOGIC CIRCUIT

Figure 6:
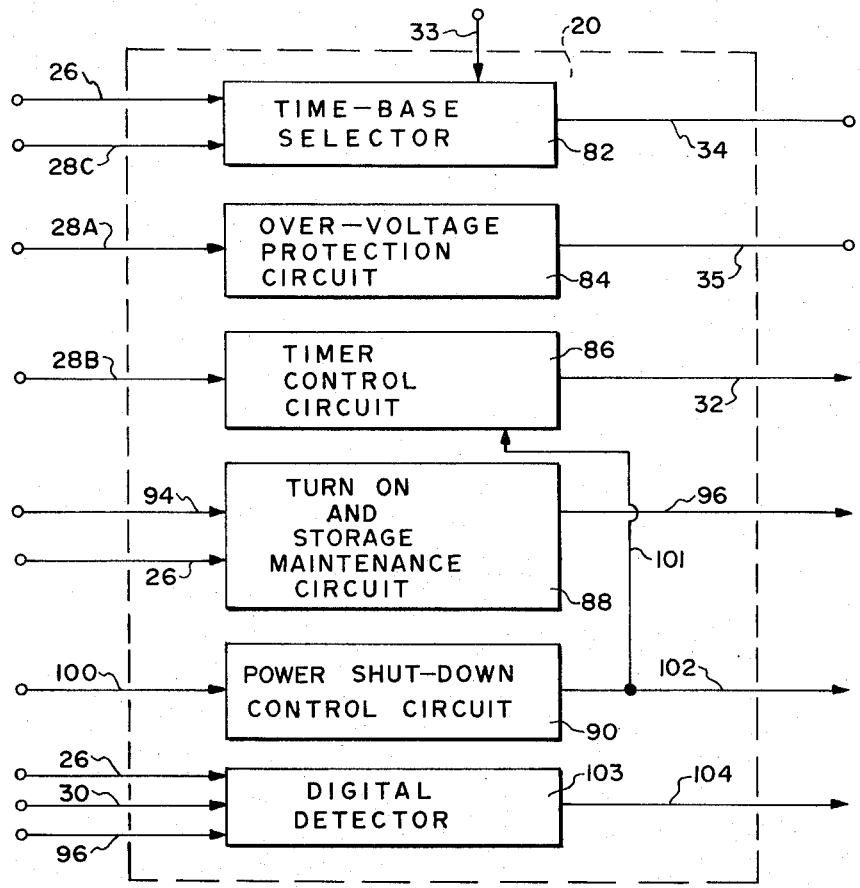
FIG. 6 is a block diagram of a charge level logic circuit useful in the battery control circuit of FIG. 1.

In FIG. 6 there is shown a block diagram of the charge-level logic circuit 20 having a time-base selector 82, an over-voltage protection circuit 84, a timer control circuit 86, a turn on and winter storage maintenance circuit 88, a power shutdown control circuit 90, and a digital detector 103.

To select the time-base for detecting a low rate of change of potential, the time-base selector 82 is electrically connected to the output terminal 72F of the counter 60 through the conductor 28C, to the output of the comparator 55 through conductor 26, to the charged mode output terminal of the timing counter 73 through the conductor 33 and to the battery charger switching unit 22 through the conductor 34. The logic within the time-base selector 82 compares the time sequence of signals from the output terminal 72F and the comparator 55, and based on this comparison, determines within about twenty seconds of the time that the battery charger control circuit 10 is started, whether the battery 14 is in a charged condition or a discharged condition, selecting the appropriate time-base for either condition.

A battery that is charged at the start of the charging run is detected by the time-base selector 82 because the counter 60 counts directly up to and perhaps beyond the output terminal 72F without the comparator 55 providing a zero potential output to the conductor 26; a battery that is discharged at the start of the charging run is detected by the time-base selector 82 because the output potential of the digital-to-analog converter 58 (FIG. 4) equals the battery potential at a potential reference level corresponding to an output of the counter 60 that is lower than output terminal 72F, resulting in the comparator 55 providing a zero potential output before the energization of conductor 28C, indicating that the battery 14 is discharged.

If the battery 14 is in a charged condition, signals from the low-rate-of-change detector 18 (FIG. 1) applied to the conductor 33 are gated to the conductor 34, which conducts them to the battery charger switching unit 22 to de-energize the battery charger 12 at the appropriate time. If the battery 14 is in a discharged condition, these signals are blocked so that the timing counter 73 counts to the discharge-mode output terminal before providing a signal to the battery charger switching unit 22 to de-energize the battery charger 12 at the end of a charging run.

Figure 7:
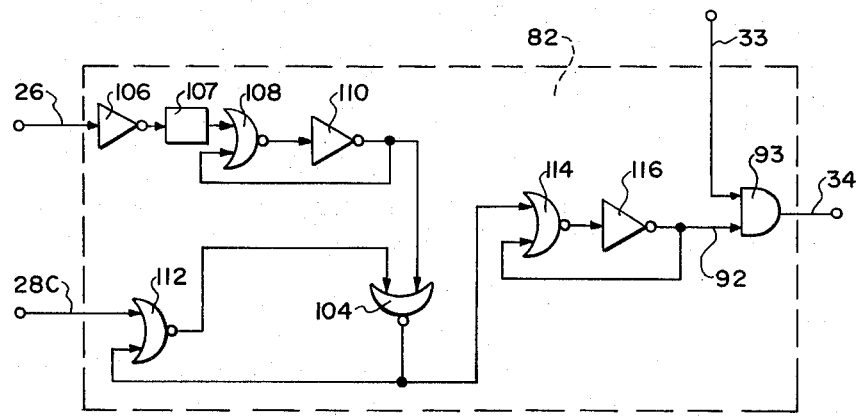
FIG. 7 is a logic block diagram of time-base selector useful in the charge level logic circuit of FIG. 6.

In FIG. 7, there is shown a logic circuit diagram of the time-base selector 82 having an input conductor 26 from the comparator 55 (FIG. 4), an input conductor 28C from the counter 60, and an output conductor 34, which is electrically connected to the battery charger switching unit 22.

The time-base selector 82 includes a NOR gate 104 which works with other components to form a latch having first and second latch inputs and a latch output, with the latch cooperating with the following elements, which are: (1) an inverter 106: (2) a filter 107; (3) a two input NOR gate 108; (4) an inverter 110, with the conductor 26, inverter 106, the filter 107, one input of the NOR gate 108, the inverter 110 and the first latch input being electrically connected in series in the order named, the output of the inverter 110 being connected to the other input of the NOR gate 108; (5) a NOR gate 112, with the conductor 28C being electrically connected to the second latch input through the NOR gate 112, the other input of the NOR gate 112 being connected to the output of the NOR gate 104; (6) a two input NOR gate 114; and (7) an inverter 116, with the latch output, one input of the NOR gate 114 and the inverter 116 being electrically connected in series in the order named, the output of the inverter 116 being connected to the other input of the NOR gate 114. A conductor 92 is electrically connected to one input of a two input AND gate 93, the other input of the AND gate being connected to the conductor 34.

In the operation of the time-base selector 82 when the battery 14 is charged at the start of the charging run, a signal is applied to the conductor 28C before a signal is applied to the conductor 26. The signal on conductor 28C causes a positive signal to be applied to the NOR gate 114 through the NOR gates 112 and 104, with the NOR gate 114 being latched by a signal fed back from inverter 116. In this latched state, a positive potential is continually applied to the AND gate 93 so that the AND gate 93 remains open to a signal applied to the conductor 33 from the timer 73 (FIG. 5) after the timer 73 has counter for approximately 5 minutes.

In the operation of the time-base selector 82 when the battery 14 is in the discharged condition at the start of the charging run, a negative-going signal is applied to the conductor 26 before a positive signal is applied to the conductor 28C. The signal on conductor 26 is applied to the first latch input of NOR gate 104 through NOR gate 108 and inverter 110, with the NOR gate 108 being latched by the feedback from inverter 110 to latch the NOR gate 104 with a zero potential output. With a zero potential output from NOR gate 104, the latch that includes NOR gate 114 and inverter 116 applies a zero potential to conductor 92 thus preventing AND gate 93 from opening when the counter 73 applies a signal to conductor 33 at the charged mode output terminal.

To avoid having a start-up transient that is applied to conductor 26 when battery charger control circuit 10 is energized preventing AND gate 93 from opening, the filter 107 is included in series between the inverter 106 and the NOR gate 108 to suppress the transient.

Under some circumstances, such as when the battery has a high internal resistance, the potential of the battery 14 may increase to an undesirable level without the battery charger 12 being de-energized. To prevent this, the over-voltage protection circuit 84 is electrically connected to the conductor 28A which is energized by the counter 60 when a voltage of 50 volts is provided by the battery 14. When the over-voltage protection circuit 84 receives a positive potential from the conductor 28A, it provides a signal to the battery-charger switching unit 22 through the conductor 35 to de-energize the battery charger 12. In the preferred embodiment conductors 28A and 35 are directly connected together.

To apply the 1.72 hertz counting pulses to the low-rate-of-change detector 18 through the conductor 32, the timer control circuit 86 has one input electrically connected to the conductor 28B of the counter 60 and another input connected to the output of the power shut-down control circuit 90 through conductor 101. The conductor 28B receives a pulse from terminal 72E of the counter 60 when the potential of the battery reaches a level of 39.7 volts, and in response to this pulse and a signal from the power shut-down control circuit 90, energizes a gated multivibrator which applies the 1.72 hertz pulses to the timing counter 73 of the low-rate-of-change detector 18 through the conductor 32.

At times, a battery is stored for a long period of time. For example, golf cart batteries may remain inactive throughout the winter months in temperate or arctic climates. During this period of storage, it is desirable to prevent the batteries from becoming completely discharged.

To prevent the batteries from becoming completely discharged when stored for a long period of time, the turn-on and storage maintenance circuit 88 has a first input electrically connected to the output of the storage battery through a conductor 94, a second input electrically connected to the comparator 55 through the conductor 26 and an output connected to the battery charger switching unit for energizing the battery charger 12 through a conductor 96. For this purpose, the turn-on and storage maintenance circuit 88 includes a switch which energizes the conductor 96 when the potential of the battery falls below a predetermined level, the predetermined level being 37 volts in the preferred embodiment.

Figure 8:
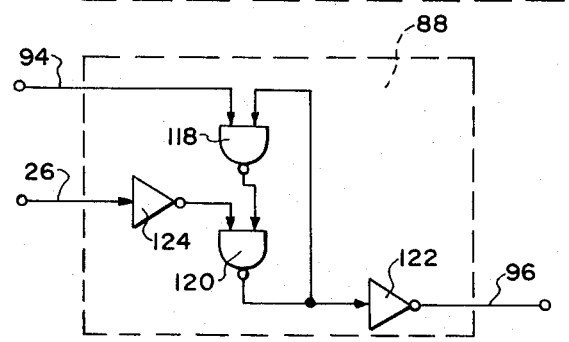
FIG. 8 is a logic circuit diagram of a turn-on an winter storage maintenance circuit useful in the charge level logic circuit of FIG. 6.

In FIG. 8, there is shown a logical circuit diagram of the turn-on and storage maintenance circuit 88, having a first input electrically connected to the comparator 55 (FIG. 4) through the conductor 26 and a second input electrically connected to receive a portion of the battery potential through a conductor 94. The conductor 94 receives a sample of the battery potential which is applied across a high resistance (not shown) so that there is no substantial drain on the battery power when the battery charger 12 is de-energized. The output of the turn-on and storage maintenance circuit is electrically connected to the battery charger switching unit 22 through the conductor 96 to energize the battery charger 12 when the battery potential is below 37 volts.

When the battery charger 12 is connected to the battery 14, the battery charger control circuit 10 begins a charging operation. Accordingly, it is not necessary to press a start button to start a charging operation, although such a button is provided for manual starting of a charging run when desired under other circumstances. This automatic turn-on is particularly useful when storing batteries for long periods of time such as during the winter months for electrically driven golf carts and the like. This turn-on and winter storage maintenance circuit charges the batteries whenever their potential falls below 37 volts and thus maintains them in the charged condition throughout the period of storage.

To enable the battery charger 12 to be energized by the battery charger switching unit 22, the turn-on and storage maintenance circuit 88 includes a first NAND gate 118, a second NAND gate 120, an inverter 122, and an inverter 124, with the output of the NAND gate 118 being connected to one of the two inputs of the NAND gate 120, with the output of the NAND gate 118 being connected to one of the two inputs of the NAND gate 120, with the output of the NAND gate 120 being connected to one of the two inputs of the NAND gate 118 and to the input of the inverter 122, with the output of the inverter 122 being electrically connected to the conductor 96, and with the output of the inverter 124 being connected to other input of the NAND gate 120. The conductor 26 is connected to the input of the inverter 124 and the conductor 94 is connected to the other input of the NAND gate 118.

When the battery potential is above 37 volts, a positive signal is present on conductor 94 and a zero potential on conductor 26, with a positive signal being present on the output of the NAND gate 120, and therefore, the other input of the NAND gate 118 and the input of the inverter 122 as well, resulting in zero potential being applied to the battery charger switching unit 22 through the conductor 96.

When the potential of the battery drops below 37 volts, the potential on conductor 94 drops, causing the output of the NAND gate 118 connected to one input of the NAND gate 120 to switch from zero potential to a positive potential. Since the battery charger 12 is de-energized and the potential at conductor 26 is zero volts, a positive potential is applied to the other of the two inputs to NAND gate 120, resulting in a positive potential being on each of the two inputs of the NAND gate 120, causing its output to switch to zero potential. With the output of the NAND gate 120 at zero potential, the output of the NAND gate 118 is latched with a positive potential output and a positive potential is applied to the battery charger switching unit 22 through the conductor 96, energizing the battery charger 12.

To unlatch the turn-on and storage maintenance circuit 88 when the battery potential reaches 38 volts, a reset pulse on conductor 26 is inverted in the inverter 124 to cause a zero potential to be applied to one of the two input terminals of the NAND gate 120, causing its output to return to a positive potential and resetting the entire circuit by applying a positive potential to one of the inputs of the NAND gate 118 and a zero potential to the conductor 96. Of course, the resetting of the turn-on and storage maintenance circuit does not terminate the operation of the battery charger since it is now under the control of the digital potential measuring circuit 16.

In practice, batteries are generally either used extensively so as to be discharged, or only lightly used as in the case of merely moving from one storage location to another. Accordingly, it would appear that the threshold between the charged and discharged modes should be at a relatively high battery potential. However, for two reasons this is not practical, which are: (1) some old batteries or batteries at high temperatures have a much lower fully-charged potential then new batteries at a lower temperature so that the threshold would be above the fully-charged potential on some batteries; and (2) it is desirable to use a binary counter for the counter 60 in the digital potential measuring circuit 16 and this type of counter is not easily adaptable for use with a high threshold between the charged and discharged modes.

Firstly, if a charged battery were to be charged in the discharged mode because the threshold between the charged and discharged mode was set above the fully-charged potential of the battery, it would require forty minutes to terminate the charging operation, even if the charging operation were initiated only to test the state of the battery. Moreover, in the preferred embodiment, a high power transformer is included in the battery charger and with such a transformer undesirable heating and excessive gassing would result during the forty minutes that charge is applied to the fully charged battery.

Secondly, the most suitable commercially available counters for use as the counter 60 in the digital potential measuring circuit 16 are binary counters and these counters do not provide an output connection that could be used to sense a high threshold potential without an expensive decoder.

In the event of a power failure, portions of the battery charger control circuit 10 may be reset, thus erasing some vital information. For example, if the battery has been charged to a potential above 41 volts, the battery charger control circuit, when restarted, would be expected to operate in the charged mode, which would be undesirable since the charging operation would terminate at a higher rate-of-change of battery potential than if it were operated in the discharged mode. On the other hand, if a circuit is included to preserve the information in the MOS counters, they will retain their count, but the battery potential will fall, causing an inaccuracy. If the source of power of the battery charger is disconnected, the power shut down control 90 applies a logical zero through conductor 101 to the timer control circuit 86 and to the counter 60 through the conductor 102, resetting these two counters when the power is disconnected. This resets the timer control circuit and prevents it from counting. The counter 60 is reset and, in turn, resets the counter 73, by a logical zero applied to it through conductor 102 from the power shut down control 90 when a.c. power is restored. Of course, the counters 60 and 73 receive power from the battery 14 and are not disconnected when the a.c. power is disconnected. Accordingly, when the a.c. power is again applied, the battery charger control circuit 10 begins operating again, except that the modes have already been selected.

The digital detector 103 includes three inputs connected respectively to: (1) the comparator 55 through the conductor 26; (2) the output of the discharged mode terminal of the timing counter 73 through the conductor 30; and (3) the output of the turn-on and storage maintenance circuit 88 through the conductor 96.

The digital detector 103 receives a signal from the timing counter 73 when the rate of change of battery potential is so low as to indicate that the battery is fully charged. In response to this signal and other indications received from the circuit, the digital detector 103 applies a signal to the conductor 104 causing de-energization of the battery charger 12.

To avoid prematurely applying a signal to conductor 104 when the highest order output terminal of the timing counter 73 is energized at some lower count such as at a half point count and then the timing counter is reset without reaching a full forty minute count, the conductor 26 receives a potential from the comparator 55 which inhibits the output on conductor 104 when a reset pulse is applied by the comparator 55 to the timing counter 73.

To avoid oscillation between the digital detector and the circuits controlled by the digital detector when the controlled circuits are turning on, the conductor 96 applies a potential to the digital detector from the controlled circuits, causing the switching action to occur more rapidly.

Figure 9:
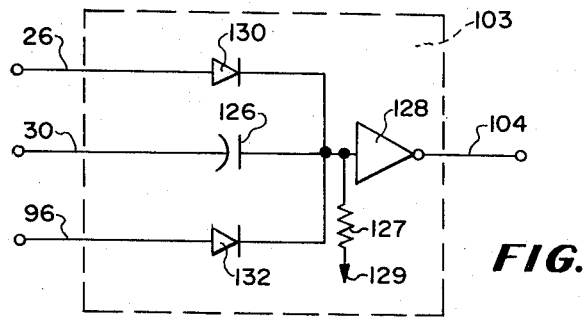
FIG. 9 is a logic circuit diagram of a digital detector useful in the charge level logic circuit of FIG. 6.

In FIG. 9, there is shown a logical circuit diagram of the digital detector 103 having a first input terminal to receive the pulses from the low-rate-of-change detector 18 on conductor 30, a second input terminal to receive input pulses on line 26, and a third input terminal to receive turn-on pulses from the turn-on and storage maintenance circuit 88 on conductor 96. The output from the digital detector 103 is applied to the battery charger switching unit 22 through conductor 104.

The digital detector 103 detects a predetermined count on a binary counter and applies a signal indicating that this count has been reached. The signal is not applied at any lower count even though the highest order output of the binary counter utilized in reaching the predetermined count receives a binary one pulse both at the predetermined count and at some lower count that occurs before the predetermined count. Moreover, in the preferred embodiment, the signal indicating that the predetermined count has been reached is generated through the use of only one stage of the counter, which stage is the highest order stage for that predetermined count.

The digital detector 103, beside detecting the predetermined count from a binary counter, also includes a circuit which aids in stabilizing the battery charger control circuit. It is necessary to stabilize the battery charger control circuit 10 because, as the battery-charger switching unit 22 begins to turn off, the potential on its input begins to increase because of the reduced current flowing through the switches therein, which increase in voltage tends to cause the battery charger switching unit 22 to turn on again. This tendency could cause oscillation at some voltage input to the battery charger switching unit 22. The digital detector 103 includes a circuit that speeds up the switching of the battery charger switching unit 22 to avoid this oscillation.

In the preferred embodiment, the digital detector 103 detects the count of the timing counter 73 (FIG. 5) indicating the expiration of a 40 minute period and applies this count to the battery charger switching unit 22 to terminate the charging operation. A circuit of this kind is not required to detect the count of the timing counter 73 at the end of the 5 minute mode of operation because, in this counter, the 5 minute count occurs at the same time that an output of the counter 73 is receiving a positive potential for the first time in the charging run. The characteristic of having an output on an output terminal that is not unique to a particular count is a characteristic of normal ripple type binary counters because the output at a particular terminal of such counters is normally combined with the output at other terminals to indicate a particular value.

To detect a signal to the conductor 30 and apply a potential to the conductor 104 connected to the battery charger switching unit 22, the digital detector 103 includes a capacitor 126, a resistor 127, a source of positive potential 129 and an inverter 128, with one plate of the capacitor 126 being connected to the conductor 30 and the other plate being connected to the input of the inverter 128 and to the source of positive potential 128 through the resistor 127, the output of the inverter 128 being electrically connected to the conductor 104.

To prevent the inverter 128 from receiving pulses at times that the highest order output of the counter 73 connected to the conductor 30 goes to a high potential at a half-count and then drops to a low potential on the resetting of the counter 73 by the comparator 55 before the full count has occurred, a diode 130 has its anode electrically connected to the output of the comparator 55 through the conductor 26 and has its cathode electrically connected to the input of the inverter 128. The high potential from the output of the comparator 55 holds the potential at the input of the inverter 128 at a high level during a reset pulse time.

When the output of the comparator 55 is low because the battery potential has not increased to a reference level where it would cause a reset pulse to be generated and the highest order output of the timing counter 73 drops in potential, the capacitor 126, resistor 127 and source 129, generates a negative pulse which is inverted by the inverter 128 and applied to the conductor 104. These events only occur at the time that the full count has been obtained in the timing counter 73.

To prevent oscillation between the controlled circuit, which is the battery charger switching unit 22 in the preferred embodiment, and the counter, a second diode 132 has its anode electrically connected to the controlled circuit and its cathode connected to the input of the inverter 128, applying a feedback signal therethrough, to cause a signal applied to the conductor 104 to increase more rapidly and therefore to switch the battery charger switching unit 22 with sufficient rapidity to avoid oscillation.

In the operation of the digital detector 103, the conductor 30 receives output signals from the discharged mode terminal of the timing counter 73 (FIG. 5) as the timing counter 73 counts from a zero count to the final stage count. At a half count point, if the timing counter 73 has not been first reset, a signal is applied to the conductor 30 from the discharge mode terminal but this signal does not indicate a full count of the timing counter 73 because the highest order output terminal is also used as one bit of lower counts. If the timing counter 73 is reset between this half-count and a final count the inverter 128 is not energized to provide a positive output pulse because a positive reset signal is applied by the comparator 55 to the inverter through the conductor 26 and the forward conductance path of the diode 130.

If a reset pulse does not occur for the full 40 minute period, a negative going pulse is applied to the discharge mode terminal 30. This results in a negative input pulse to the input terminal of the inverter 128 and a positive output pulse on conductor 104.

When the battery charger is energized, the potential at the input of inverter 128 is low and requires time to increase, in which time the low potential at the input to inverter 128 could case the battery charger switching unit 22 to deenergize the battery charger 12. Each time the battery charger would be energized this would repeat, causing oscillation. However, the potential from the turn-on and storage maintenance circuit 88 is applied through conductor 96 to the base of the inverter 128, causing a faster switching action which drives the battery charger switching unit 22 beyond the oscillating conditions so as to stabilize the circuit.

BATTERY CHARGER SWITCHING UNIT

Figure 10:
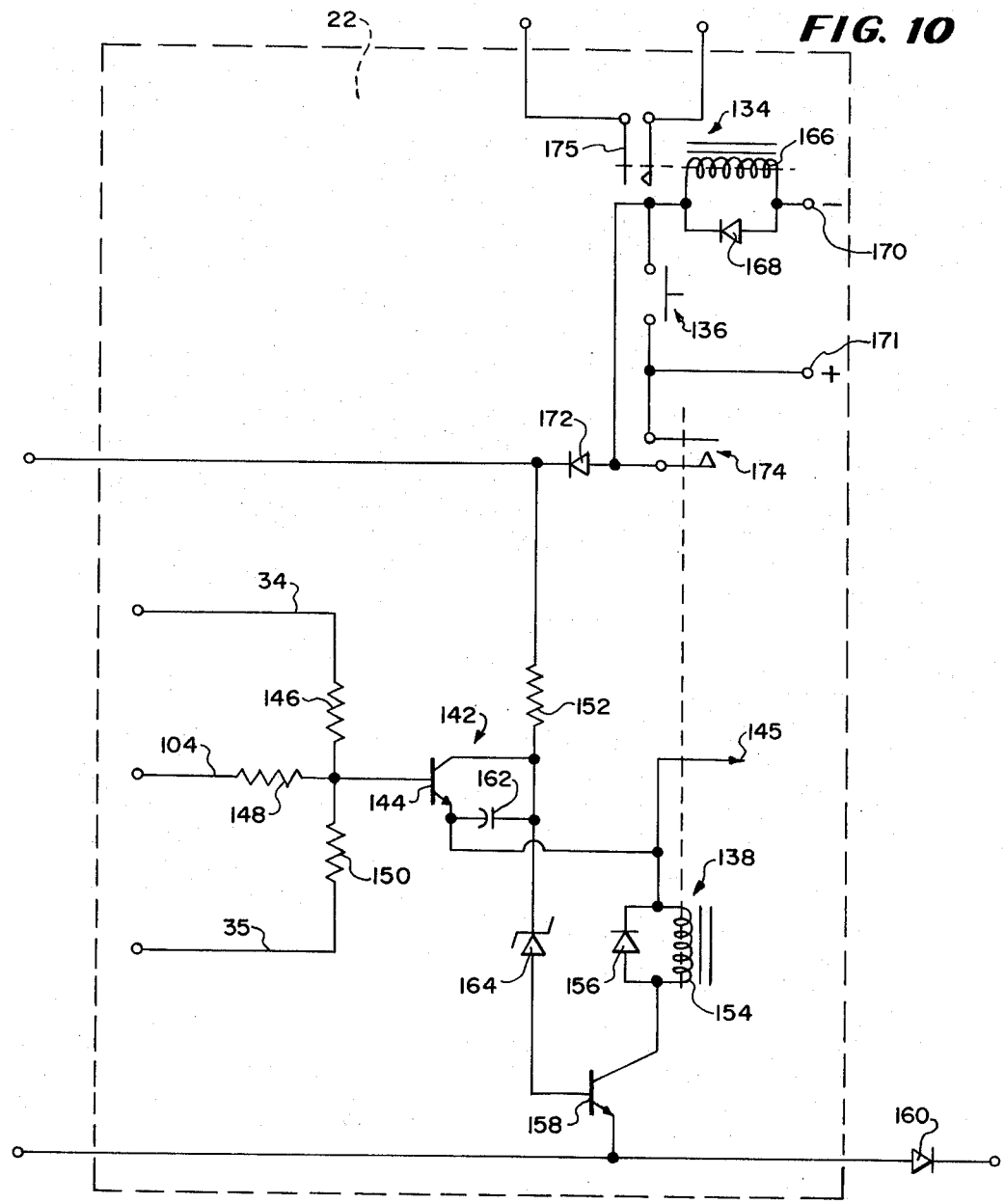
FIG. 10 is a schematic circuit diagram of a battery charger switching unit useful in the battery control circuit of FIG. 1.

In FIG. 10, there is shown a schematic circuit diagram of the battery charger switching unit 22 having a power control relay 134, a manual switch 136, a control relay 138, and a main logic switch 142.

The battery charger 12 is de-energized whenever a positive signal is received over any of the three conductors, which are: (1) conductor 35 from the over-voltage protection circuit 84; (2) conductor 104 from the digital detector 103 at the end of a charging run occurring in the discharged battery mode; or (3) over conductor 34 from the time base selector 82 at the end of the charging run in the charged battery mode.

To de-energize the battery charger 12 when a signal is received over any of the conductors 35, 104 or 34, the main logic switch 142 includes an npn transistor 144 having its base connected to each of the conductors 34, 104, and 35 through a respective one of the resistors 146, 148, and 150 to form a resistor-transistor OR circuit. To provide potential to the collector of the transistor 144, the collector is connected to a source of positive potential through a resistive circuit 152.

To control the main power relay 134 in response to signals from the main logic switch 142, the control relay 138 includes a relay coil 154 shunted by a diode 156 and connected at one end to the collector of an npn transistor 158, the emitter of the transistor 158 being connected to the source of negative potential from the battery through a diode 160. The other end of the relay coil 154 is connected to the emitter of the transistor 144, to a source of positive potential 145, and to one plate of a capacitor 162, the other plate of the capacitor 162 being electrically connected to the collector of the transistor 144. A zener diode 164 has its cathode electrically connected to the collector of the transistor 144 and to one plate of the capacitor 162 and has its anode electrically connected to the base of the transistor 158.

To energize or to de-energize the battery charger 12, the main power relay circuit 134 includes a coil 166 shunted by a diode 168, with the coil 166 being connectible at one end to a source of positive potential 171 through a pair of normally open contacts 174 controlled by the control relay 138, one contact of the pair of contacts 174 and the other end of the coil 166 being connected to the anode of the blocking diode 172. The one contact of the relay is electrically connected to one of the fixed contacts of manual switch 136 and to a source of positive potential, the other fixed contact of the manual switch 136 being connected to the other side of the coil 166, with the moving contacts of the manual switch connecting these two contacts when depressed. The cathode of the blocking diode 172 is connected to the resistor circuit 152 and one power bus for the battery charger control circuit 10 and the anode of the diode 160 is connected to another power bus for the battery charger control circuit 10. When energized, the coil 166 closes contacts 175 of the power relay 134 to energize the battery charger.

The battery charger switching unit 22 operates in the same manner whether an over-voltage protection pulse is applied to the conductor 35, a signal from the digital detector 103 is applied to the conductor 104, or a signal from the time base selector 82 is applied to conductor 34. In each case, the battery charger switching unit 22 de-energizes the battery charger 12 (FIG. 1) by first de-energizing the control relay 138, and then, as a result of the de-energization of the control relay 138, de-energizing the power relay 134.

To de-energize the control relay 138 whenever a positive signal is applied to one of the conductors 35, 104, or 34, the transistor 144 is driven into conduction by the current flowing from the base to the emitter causing the potential at the cathode of Zener diode 164 to fall to the level of source 145, switching this zener diode off. When the zener diode 164 is off, the transistor 158 is biased into its nonconductive state, de-energizing relay 138.

When the control relay 138 is de-energized, the normally open contacts 174 of the control relay 138 are opened, thus breaking the circuit through the coil 166 of the power relay 134. When the circuit through the coil 166 is broken, the normally open contacts of the power relay 134 are permitted to open, thus de-energizing the battery charger 12.

With the mechanization, a relatively small amount of power is able to control the energization and de-energization of the battery charger 12. Because a relatively small amount of power is necessary, the transistors 144 and 158 in the battery-charger switching unit 22 may be of a relatively inexpensive type.

Although the preferred embodiment of the invention has been described with some particularity, many modifications and variations are possible in the preferred embodiment without deviating from the invention. Accordingly, it is to be understood, that within the scope of the appended claims, the invention may be practiced otherwise than as specifically described.

What is claimed is:

1. A method of controlling the charging of a battery comprising the steps of:
   charging the battery at a rate above a certain rate;
   sensing the energy level of the battery;
   generating a plurality of energy-level digital signals, each corresponding to a different energy level of the battery;
   determining when the time elapsed between at least certain of said energy-level digital signal exceeds a predetermined maximum time; and
   reducing the rate of charging the battery below said certain rate when said elapsed time between said certain energy-level digital signals increases above said predetermined maximum time.

2. A method according to claim 1 in which the step of reducing the rate of charging of the battery when said elapsed time increases above a predetermined maximum includes the step of reducing the rate of charging of the battery when the time after a first of two successive energy levels exceeds said predetermined maximum time before the second of two successive energy levels is reached.

3. A method according to claim 1 in which:
   the step of sensing the energy level of the battery includes the step of classifying the energy level of the battery at the start of a charging run into different classes each corresponding to a different one of a plurality of ranges of energy levels of the battery; and
   the step of reducing the rate of charging of the battery when said time increases above a predetermined maximum time includes the step of selectively reducing the rate of charging of the battery when said predetermined maximum time is a first maximum time for an energy level at the start of a charging run in a first class and reducing the rate of charging of the battery when said predetermined maximum time is a second maximum time for an energy level at the start of the charging run in another class.

4. A method according to claim 3 in which the step of classifying includes the steps of:
   determining the length of time required for the battery potential to reach a predetermined amplitude from the time the charging run starts;
   generating a first classification signal when the amplitude reaches said predetermined amplitude prior to said predetermined time; and
   generating a second classification signal when the amplitude fails to reach said predetermined amplitude in said predetermined time.

5. A method according to claim 4 in which the step of determining when the time elapsed between at least certain of said energy-level digital signals includes the steps of:
   generating a series of periodic timing digital signals representing successively longer time periods starting with the time of occurrence of one of said energy-level digital signals; and
   applying said series of timing digital signals to a timing counter, whereby successive output terminals of said counter represent successively longer periods of time from the occurrence of said one of said energy levels.

6. A method according to claim 1 in which the step of generating energy-level digital signals includes the steps of:
   generating a series of digital signals representing successively higher values;
   converting at least certain of the digital signals to analog signals having corresponding values;

comparing the analog signals with the energy level of the battery; and terminating the generation of signals while the analog value and the energy of the battery are in a predetermined relationship with each other, whereby the energy-level digital signal are proportional to the energy level of the battery.

7. A method according to claim 1 in which the step of charging the battery includes the step of applying a regular charge to the battery.

8. A method according to claim 7 in which the step of reducing the rate of charging includes the step of reducing the rate of charging to zero.

9. Apparatus for controllung the charging of a battery comprising:

input means for carrying a signal representing the potential of a battery;

measuring means for generating a plurality of energy-level digital signals indicating energy levels of the battery;

timer means for determining when an elapsed time between at least certain of said energy-level digital signals exceeds a predetermined maximum time; and switch means for reducing the rate of charging of the battery when said elapsed time between said energy-level digital signals exceeds said predetermined maximum time.

10. Apparatus according to claim 9 in which said measuring means comprises:

a counter;

a digital-to-analog converter having an input electrically connected to said counter and an output whereby said output provides an analog signal corresponding to the count of said counter;

a comparator having first and second inputs and an output;

said first input being adapted to be electrically connected to said battery;

said second input being electrically connected to the output of said digital-to-analog converter; and measuring-means pulse-generator means having an input and an output for applying series of pulses to its output when a predetermined potential is applied to its input;

said input of said measuring-means pulse-generator means being electrically connected to the output of said comparator and said output of said measuring-means pulse-generator means being electrically connected to the input of said counter.

11. Apparatus according to claim 10 in which:

said measuring means includes means for determining in which of a plurality of ranges of energy levels said battery is at the start of a charging run; and said switch means includes a means for selectively reducing the rate of charging of the battery at a first maximum time when the energy level at the start of the charging run is in a first of said ranges and at said second time when the energy level at the start of the charging run is in a second of said ranges.

12. Apparatus according to claim 11 in which said means for determining in which of a plurality of ranges of energy levels said battery is comprises means for determining if the potential of said battery has a predetermined amplitude within a predetermined period of time from the start of a charging run.

13. Apparatus according to claim 12 in which said timer means comprises:

a timer counter;

said timer counter having an input and at least one output;

timer pulse-generator means for generating a plurality of pulses;

said timer pulse-generator means being electrically connected to the input of said timer counter, whereby a signal on the output of said timer counter indicates the time from the last output signal from said comparator to said measuring means.

14. Apparatus according to claim 13 further comprising:

battery charger means for applying a regular charge to said battery;

said timer counter including a first output terminal and a second output terminal;

said means for determining includes means for de-energizing said battery charger means when said timer counter applies a pulse to said first output terminal if said energy level is in said first range at the start of the charging run and when said timer counter applies a pulse to said second output terminal if said energy level is in said second range at the start of the charging run.

15. Apparatus according to claim 9 in which:

said measuring means includes means for determining in which of a plurality of predetermined ranges of energy levels said battery is at the start of a charging run; and said switch means includes a means for selectively reducing the rate of charging of the battery at a first maximum time when the energy level at the start of the charging run is in a first of said ranges and at a second time when the energy level at the start of the charging run is in a second of said energy ranges.

16. Apparatus according to claim 15 which said switch means comprises:

a timer counter;

said timer counter having an input and at least one output;

pulse generator means for generating a plurality of pulses;

said pulse generator means being electrically connected to the input of said counter; and the output of said counter providing at least one timing signal.

17. Apparatus according to claim 16 in which said timer counter includes two outputs and means for connecting a first of said outputs to said means for reducing when the energy level at the start of the charging run is in a first of said ranges and for connecting a second of said outputs to said means for reducing when the energy level at the start of the charging run is in a second of said ranges.

18. Apparatus according to claim 9 in which:

said measuring means includes a counter;

said apparatus further including an over-voltage protection means for actuating said switch means when a predetermined maximum battery potential is achieved;

one output of said counter being electrically connected to said over-voltage protection means.

19. Apparatus according to claim 18 in which said measuring means further comprises:
- a digital-to-analog converter having an input electrically connected to said counter and to an output, whereby said output provides an analog signal corresponding to the count of said counter;
- a comparator having first and second inputs and an output;
- said first input being adapted to be electrically connected to said battery;
- said second input being electrically connected to the output of said digital-to-analog converter; and
- pulse generator means having an input and an output for generating a series of pulses when a predetermined potential is applied to its input;
- said input of said pulse generator means being electrically connected to the output of said comparator and said output of said pulse generator means being electrically connected to the input of said counter.

* * * * *